(12) United States Patent
Yoshino

(10) Patent No.: US 6,357,819 B1
(45) Date of Patent: Mar. 19, 2002

(54) SHAPED FOAMABLE MATERIALS

(75) Inventor: Masao Yoshino, Toyota (JP)

(73) Assignee: Neo-Ex Lab., Inc., Toyota (JP)

( * ) Notice: Subject to any disclaimer, the term of this patent is extended or adjusted under 35 U.S.C. 154(b) by 0 days.

(21) Appl. No.: 09/450,932

(22) Filed: Nov. 29, 1999

(30) Foreign Application Priority Data

Nov. 30, 1998 (JP) .......................................... 10-340463

(51) Int. Cl.$^7$ .............................................. B62D 29/04
(52) U.S. Cl. ..................................... 296/189; 296/187
(58) Field of Search ................................ 296/189, 199, 296/203.01, 204, 205, 187, 203.03, 901; 393/136; 264/275, 46.6; 52/406.1, 783.1; 156/79

(56) References Cited

U.S. PATENT DOCUMENTS

| | | | |
|---|---|---|---|
| 3,834,962 A | 9/1974 | Strumbos ..................... | 156/79 |
| 5,160,465 A | 11/1992 | Soderberg | |
| 5,631,027 A | 5/1997 | Takabatake | |
| 5,631,304 A | 5/1997 | Hasegawa ..................... | 521/94 |
| 5,642,914 A | 7/1997 | Takabatake | |
| 5,649,400 A | 7/1997 | Miwa | |
| 5,678,826 A | * 10/1997 | Miller ..................... | 296/187 X |
| 5,708,042 A | 1/1998 | Hasegawa ..................... | 521/94 |
| 5,800,896 A | 9/1998 | Kobayashi | |
| 5,806,915 A | 9/1998 | Takabatake | |

FOREIGN PATENT DOCUMENTS

| | | |
|---|---|---|
| JP | 01141140 A | 6/1989 |
| JP | 06156317 A | 6/1994 |
| JP | 07232664 A | 9/1995 |
| JP | 08127298 A | 5/1996 |
| JP | 10053156 A | 2/1998 |
| WO | 97/02967 | 1/1997 |

OTHER PUBLICATIONS

U.S. application No. 09/129,228, Yoshiro, filed Aug. 5, 1998.

U.S. application No. 09/322,779, Yoshino, filed Jun. 28, 1999.

\* cited by examiner

Primary Examiner—Joseph D. Pape
Assistant Examiner—Jason Morrow
(74) Attorney, Agent, or Firm—Brobeck, Phleger and Harrison, LLP

(57) ABSTRACT

Shaped foamable structures 10 for filling hollow structural members 1 preferably include a shaped foamable material 11 constructed from a plurality of foamable pieces 12 that are arranged with desired clearances and are interconnected with each other, and a support member 30 for positioning the shaped foamable material 11 within a cavity 6 of the hollow structural member 1. Methods for using the shaped foamable structures 10 include placing the shaped foamable structures 10 within the hollow structural members 1 and heating the foamable material 11 to expand and fill the hollow structural member 1.

37 Claims, 3 Drawing Sheets

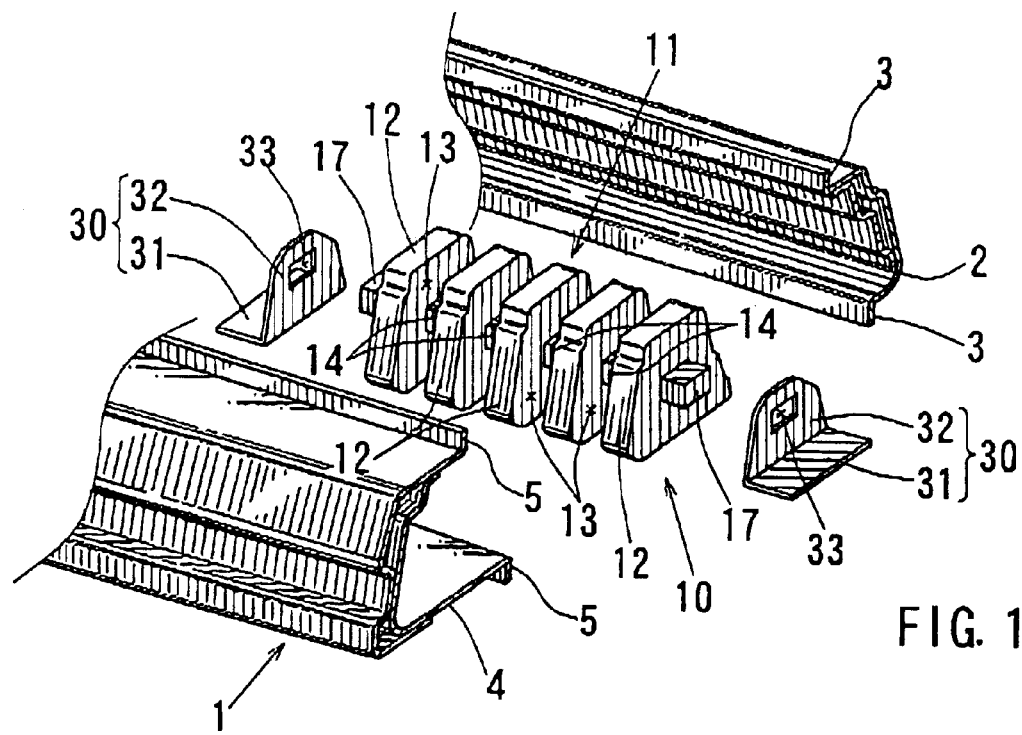
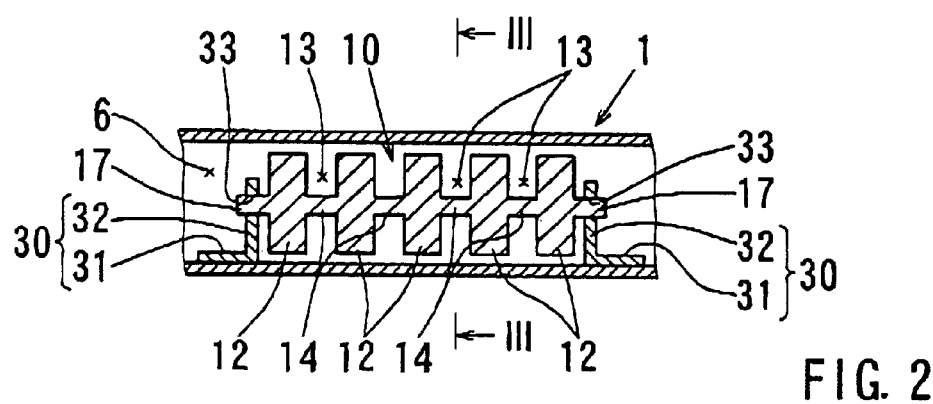
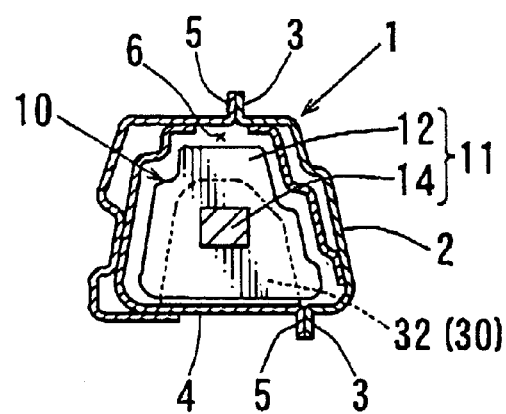
FIG. 1
FIG. 2
FIG. 3

SHAPED FOAMABLE MATERIALS

BACKGROUND OF THE INVENTION

1. Field of the Invention

The present invention relates to shaped foamable structures that can be used, for example, to fill a cavity of a hollow structural member and to reinforce the hollow structural member. The present invention also relates to shaped foamable materials and attaching devices that can be used to support the shaped foamable materials in a closed box-like hollow structural member constructed from a plurality of plates, such as rocker panels, pillars and roof side panels of a vehicle body. After being expanded, the foam material increases the damping and sound insulating properties of the hollow structural member and increases the strength and rigidity of the hollow structural member.

2. Description of the Related Art

Japanese Patent Laid-Open Application Number 8-208871, and its corresponding U.S. Pat. No. 5,631,304, describe a foamable material for filling and reinforcing a hollow structure. In particular, a foamable material having block-like structure is taught and the block-like structure preferably has the same profile as the interior of the hollow structure. The block-like structure is placed against the interior of the hollow structure and heated in order to expand or foam the material, thereby filling and reinforcing the hollow structure.

SUMMARY OF THE INVENTION

It is an object of the present teachings to provide improved filling and reinforcing shaped foamable materials for hollow structures Preferably, by modifying the exterior shape of the shaped foamable material, the time required to completely foam the shaped foamable material can be significantly reduced. In addition, it may be possible to improve the expansion properties of the shaped foamable materials.

In one aspect of the present teachings, a shaped foamable material is formed from a plurality of foamable pieces. Preferably, the foamable pieces have clearances between each foamable piece, but are interconnected to each other for convenience of use. One or more support members or attaching means may be provided to position the interconnected foamable pieces within the cavity of the hollow structural member. Preferably, the interconnected foamable pieces do not contact the interior surface of the hollow structure. Instead, only the support members or attaching means contact the interior surface of the hollow structure. Therefore, the interior surface of the hollow structure can be painted after the foamable pieces are mounted inside the hollow structure, and before expanding the foamable pieces, because the foamable pieces do not block or cover the interior surface of the hollow structure.

With such interconnected foamable pieces, external heating for expanding the shaped foamable material can be effectively conducted throughout the entire shaped foamable material. That is, the clearances provided between the foamable pieces allow the entire shaped foamable material to be quickly and uniformly heated, thereby ensuring that the foam pieces expand at the desired ratio in a short amount of time.

Such a shaped foamable material is particularly advantageous for a hollow structure having a relatively large cross-sectional area, because the shaped foamable material should have a corresponding large cross-sectional area, so as to sufficiently fill the hollow structure cavity after expansion. The clearances provided within the present shaped foamable materials considerably reduce the time that it takes to completely foam or expand the shaped foamable material compared to foamable materials having a block shape. For example, if a block like foamable material is utilized for a hollow structure having a particularly large cross section, the center portion of the block like foamable material may not sufficiently foam or expand. Such problems can be overcome by the present shaped foamable materials.

In one aspect, the interconnected foamable pieces of the shaped foamable material can be integrally formed by injection molding. This alternative provides an easy to use shaped foamable material, if the cavities of the hollow structures have uniform lengths. In the alternative, the interconnected foamable pieces can be separately formed. After forming the individual pieces, the foamable pieces can be interconnected by a variety of means for connecting the foamable pieces. Therefore, the length of the shaped foamable material can be easily changed, if necessary.

The present teachings will become more fully apparent from the following description and claims as it proceeds in connection with the drawings.

BRIEF DESCRIPTION OF THE DRAWINGS

FIG. 1 is an exploded perspective view of a shaped foamable material for a rocker panel according to a first representative embodiment of the present teachings;

FIG. 2 is a vertical sectional view of the shaped foamable material disposed in a cavity of the rocker panel before the shaped foamable material is expanded;

FIG. 3 is a sectional view taken along the line III—III in FIG. 2;

DETAILED DESCRIPTION OF THE INVENTION

Figure 4:
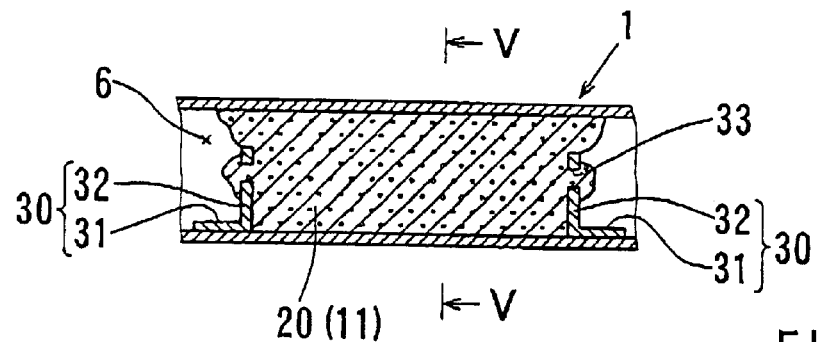
FIG. 4 is a vertical sectional view of the shaped foamable material disposed in the cavity of the rocker panel after the shaped foamable material is expanded.

In the course of further researching the foamable materials described in U.S. Pat. No. 5,631,304, it was discovered that the expansion or foaming properties of the foamable materials could be remarkably improved by modifying the shape of the foamable materials. In particular, it was found that a fin like foamable structure can be quickly expanded using external heat. This fin like structure will expand into a uniform foamed structure that provides excellent sound proofing and reinforcing properties. Other types of structures that improve the uniform heating and foaming capabilities of the foamable materials are naturally contemplated by the present teachings.

In addition, the block shaped foamable material of U.S. Pat. No. 5,631,304 is mounted onto the surface of the hollow structure before expansion. However, if the hollow structure has not been painted before the block shaped foamable material is placed inside the hollow structure, the portions of the hollow structure interior can not be painted to protect the hollow structure interior from corrosion. That is, if the foamable material is mounted directly onto the interior surface of the hollow structure, the foamable material may block the paint from reaching the portions of the interior surface of the hollow structure.

Therefore, in order to provide an improved shaped foamable structure, one or more mounting devices may preferably be used to provide a clearance between the foamable structure and the interior surface of the hollow structure. Thus, the hollow structure can be assembled with the foamable material mounted inside the hollow structure using at least one mounting device, such that the foamable material does not cover or block any interior surfaces of the hollow structure. After painting the interior of the hollow structure, for example by dip painting, the foamable material can be heated to expand and fill the hollow structure. In this case, the interior surface of the hollow structure has been painted to prevent corrosion.

As a result, the foamable materials are preferably shaped for hollow structural members, such that the shaped foamable material is formed from a plurality of foamable pieces that are arranged with desired clearances and are interconnected with each other. Preferably, an attaching means is utilized to position the shaped foamable material in a cavity of the hollow structural member. The shaped foamable material may preferably be disposed within the cavity of the hollow structural member in such a way that the foamable pieces of the shaped foamable material are arranged along the longitudinal direction of the hollow structural member. Most preferably, the shaped foamable material has a shape appropriate for a rocker panel of a vehicle body.

The foamable pieces of the shaped foamable material may be integrally formed by injection molding. In the alternative, the respective foamable pieces of the shaped foamable material may be separately formed and then interconnected to provide an easy to use shaped foamable material. For example, the foamable pieces may be interconnected with a connecting means, which for example may be a tenon and a corresponding mortice provided on the opposite surfaces of each of the foamable pieces, respectively. The tenon and mortise may have any of a variety of corresponding shapes.

In addition, methods of using foamable materials are taught. For example, the shaped foamable structure may be disposed inside of a hollow structure and the shaped foamable structure and the hollow structure may be heated, thereby expanding the shaped foamable Structure. Preferably, a cross-linked, rigid foam structure is formed within the hollow structure, thereby providing sound dampening properties and reinforcing the hollow structure. Various compositions may be utilized to form the shaped foamable structure. Further, means for expanding the shaped foamable structure, other than heating, may be utilized. Additionally, one or more support pieces may be utilized to fix the shaped foamable structure inside the hollow structure, so that the shaped foamable structure does not contact the interior of the hollow structure. Moreover, the hollow structure may optionally be dipped in a paint bath after the shaped foamable structure has been placed inside the hollow structure, but before the shaped foamable material is expanded.

For the purposes of this specification, the term "foamable" is used to describe materials that can be expanded in size by means of an external energy source, such as heat. Thus, a "foamable" material is capable of expanding to form a foam like structure. The expansion ratio typically can be adjusted by adjusting the various compositions utilized to form the foamable material.

Each of the additional features and constructions disclosed above and below may be utilized separately or in conjunction with other features and constructions to provide improved shaped foamable materials and methods for making and using such shaped foamable materials. Detailed representative examples of the present invention, which examples utilize many of these additional features and constructions in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

Figure 5:
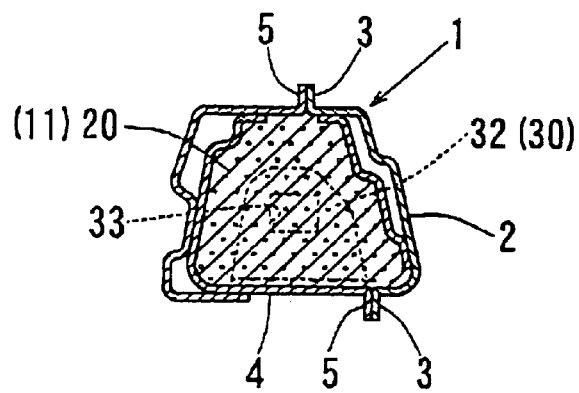
FIG. 5 is a sectional view taken along the line V—V in FIG. 4.
Figure 6:
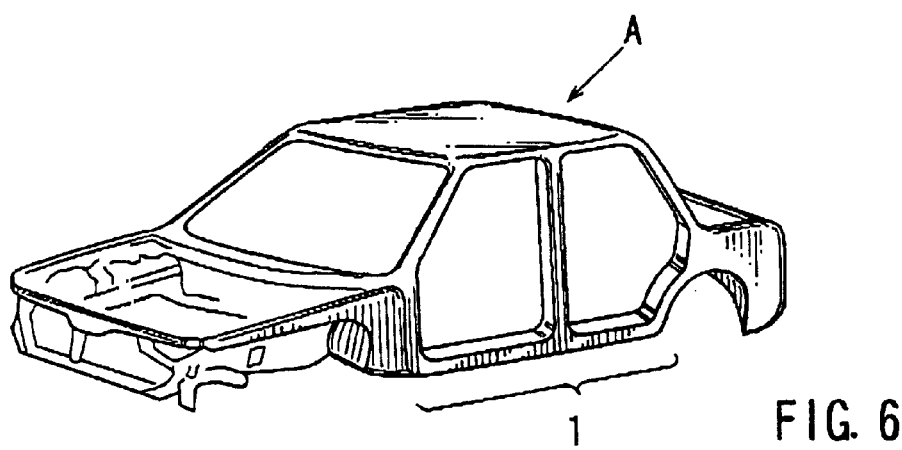
FIG. 6 is a schematic view of a vehicle body showing the position of the rocker panel.

A first representative embodiment of the invention is shown in FIGS. 1 to 6. As shown in FIG. 6, a rocker panel 1 of a vehicle body A will be used as an example of a representative hollow structural member. As best shown in FIGS. 1 and 3, the rocker panel 1 is constructed from an elongated inner panel 2 having flanges 3 extending along the peripheral edges of the elongated inner panel 2, and an elongated outer panel 4 having flanges extending along the peripheral edges of the elongated inner panel 2. As will be readily appreciated, each of the inner panel 2 and the outer panel 4 is a two-piece construction having a pair of panel pieces. Such two-piece panels are used in order to increase the strength of the rocker panel. However, each of the panels 2 and 4 can be of a one-piece construction, if desired. The inner panel 2 and the outer panel 4 preferably are welded at flanges 3 and 5 by spot welding, so that the rocker panel 1 has an elongated, enclosed hollow structure and has a longitudinally extending cavity 6 inside the hollow structure.

As best shown in FIGS. 1 to 3, a shaped foamable structure 10 is preferably fixed within the cavity 6 of the rocker panel 1. This shaped foamable material 11 can be expanded to fill the cavity 6 and reinforce the rocker panel 1. The shaped foamable structure 10 is preferably constructed from a shaped foamable material 11 that is in an unfoamed state, and an attaching means or a pair of support members 30 for positioning the shaped foamable material 11 in the cavity 6. Each of the support members 30 can be a folded plate-like member that is formed of a steel plate and has a fixture base 31 and a support wall 32 that cross at right angles. Other designs for the support member naturally may be utilized.

The support members 30 are preferably disposed in the cavity 6 of the rocker panel 1 at desired intervals in such a way that the support walls 32 are facing each other and are substantially perpendicular to the longitudinal direction of the cavity 6. The fixture bases 31 of the support member 30 can be secured to an inner surface of the rocker panel 1 by spot welding or other such fixing methods, so that the support members 30 are attached to the cavity 6. As best shown in FIG. 1, the support wall 32 of each support member 30 preferably has a non-circular opening 33 that is formed at the center of each support wall 32. The opening 33 may have a variety of shapes, although it preferably has a rectangular shape in this embodiment.

As will be readily appreciated, the fixture bases 31 may be secured to the bottom surface of the outer panel 4 before the inner panel 2 and outer panel 4 are welded at flanges 3 and 5 in order to form the rocker panel 1. In other words, the inner panel 2 and the outer panel 4 provided with the support members 30 are joined to each other, thereby forming the hollow rocker panel 1 that receives the support members 30 in the cavity 6 of the hollow rocker panel 1.

As best shown in FIG. 3, the support wall 32 of each support member 30 has an external dimension sufficiently smaller than the dimension of the transverse cross section of the cavity 6, so as to form a clearance between the periphery of the support member 30 and the inner surface of the rocker panel 1. This clearance is intended to permit paint to flow within the cavity 6 of the rocker panel 1 along the inner surface of the rocker panel 1, when the vehicle body A is dipped into a paint bath. As will be recognized, the paint can be introduced into the cavity 6 through paint introduction holes (not shown) that may be formed in the rocker panel 1.

In this representative embodiment, although the pair of support members 30 are secured to the inner surface of the rocker panel 1 by spot welding, the support members 30 can be secured together using other securing means, such as screws, clips, magnets and adhesives, etc. In addition, the support members 30 can be made from heat-resistant synthetic resins or other such materials instead of a metal, such as steel.

Further, as shown in FIGS. 1 and 2, the shaped foamable material 11 can be a one piece clement and can be supported by the pair of support members 30. The shaped foamable material 11 may preferably be constructed from a series of plate-like foamable pieces 12 that are arranged in parallel with desired clearances 13, a plurality of connecting pieces 14 that integrally interconnect the foamable pieces 12 at their central parts, and a pair of engagement projections 17 that are integrally provided on the foamable pieces 12 that are positioned at both ends of the series, respectively. As best shown in FIG. 2, these engagement projections 17 may project outward in an opposite relation and can engage the openings 33 of the support members 30. Each engagement projection 17 may preferably be adapted to tightly fit into the opening 33 that is formed in the support wall 32 of each support member 30. That is, the engagement projection 17 may, for example, have a rectangular cross section that corresponds to the rectangular cross section of the opening 33. Therefore, the support members 30 can non-rotatably fix the shaped foamable material 11 when each engagement projection 17 is inserted into the opening 33 of the support member 30.

Moreover, as best shown in FIG. 3, each of the foamable pieces 12 in the unfoamed state preferably has an outer dimension that substantially conforms to the transverse crosssectional configuration of the cavity 6. Further, the external dimension may be slightly smaller than the dimension of the transverse cross section of the cavity 6, so that a clearance exists between the periphery of the foamable pieces 12 and the inner surface of the rocker panel 1. This clearance is intended to permit paint to flow in the cavity 6 of the rocker panel 1 along the inner surface of the rocker panel 1, when the vehicle body A is dipped into the paint bath.

While various compositions can be utilized to form the shaped foamable material 11 (i.e., the foamable pieces 12, the connecting pieces 14 and the engagement projections 17), it is preferably made of a foamable material, such as foaming agents containing synthetic resinous materials, that can foam or expand at temperatures from about 110° C. to about 190° C. to provide a foamed product 20 (FIGS. 4 and 5). In addition, the foamable material preferably contains metal adhesive resins, fibrous materials and other additives, so as to produce a foamed product 20 that has high rigidity when it is expanded within the above-noted temperature range. By way of example, the foaming agents may be azodicarbonamide (ADCA), oxy-bis(benzenecarbonyl hydrazide), dinitrosopentamethylenetetramine or other similar compounds. The metal adhesive resins may be an ethylene-methyl acrylate copolymer resin (EMA), an ethylene-ethyl acrylate copolymer (EEA), an etylene-butyl acrylate copolymer (EBA) or other similar compounds. The fibrous materials may be glass fibers, organic fibers or other fibers. Further, the foamable material preferably is formulated so as to expand at an expansion ratio of about 2 to 5. Further examples of representative foamable material that can be used with the present teachings are disclosed in U.S. Pat. No. 5,631,304 and U.S. patent application Ser. No. 09/322,779, filed May 28, 1999, which patent references are hereby incorporated by reference in their entirety.

In one preferred aspect of the present teachings, a foam precursor material includes an epoxy resin having an epoxy equivalents value of 300–4000, a curing agent and a foaming agent. Preferably, this foam precursor material is curable and expanded by heat. The curing agent preferably has a curing temperature of about 100–200° C. The "epoxy equivalents value" is defined herein as the epoxy resin molecular weight (g/mole) per epoxy group. For example, an epoxy resin molecule having a molecular weight of 1000 g/mole and having 2 epoxy groups in the molecule has an "epoxy equivalents" value of 500. Preferably, the foam precursor material is substantially stable at temperatures below about 50° C.

The foam precursor material also may contain at least one type of thermoplastic resin selected from vinyl acetate and ethylene copolymer, ethylene and alkyl acrylate copolymer and/or polyethylene resin. Further, the foam precursor also may contain a reinforcing material such as glass, metal and/or ceramic.

Preferably, the foam precursor material can be prepared by (1) heating and melting the epoxy resin, (2) adding the curing agent, foaming agent and any other desired additives to the molten epoxy resin, and (3) kneading the mixture. The curing and foaming agents are preferably handled at a temperature below the respective curing and foaming temperatures.

Epoxy resins having suitable epoxy equivalents are not restricted to a single type of epoxy resin. Rather, combinations of epoxy resins also may be used. Representative epoxy resins include, but are not limited to, glycidyl ether, glycidyl ester, glycidyl amine and alicyclic. Other types of epoxy resins may be used. In particular, bisphenol A, bisphenol F, brominated bisphenol A, hydrogenated bisphenol A, bisphenol S, bisphenol AF, biphenyl, naphthalene, fluorene, phenol novolac, ortho-cresone novolac, DPP novolac, trifunctional, tris-hydroxyphenylmethane, tetraphenolethane and other glycidyl ether types are preferred. Most preferably, bisphenol A, brominated bisphenol A, hydrogenated bisphenol A are used as the epoxy resin. Further, Epotote® manufactured by Toto Kasei, K.K. and Epikote® manufactured by Yuka Shell Epoxy Co. may be used as the epoxy resin.

Preferred curing agents include polyaddition type, catalyst type and condensation type curing agents. The polyaddition type curing agents include, but are not limited to, polyamine-based dicyandiamide and the acid anhydride-based methyl nadic acid anhydride. The catalyst type curing agents include, but are not limited to, imidazole-based 2-methylimidazole, 2-ethyl 4-methylimidazole and 2-heptadecyl imidazole, Lewis acid-based monoethylamine boron trifluoride, piperazine boron trifluoride and other related compounds. Specifically, Amicure® (a product of Ajinomoto), amine-based curing agents, such as dicyandiamide, imidazole-based curing agents including Curazole® (a product of Shikoku Kasei) and Epicure® (a product of Yuka Shell), monoethylamine trifluoride complexes and other related compounds may be used. PN-23 (a product of Ajinomoto), an amine-based curing agent, and AH-62 (a product of Ajinomoto), an imidazolebased curing agent are particularly preferred.

The amount of curing agent used in the foamable materials will differ depending on the epoxy equivalents of the epoxy resin. Generally, an amount of curing agent is utilized that will effectively cure the epoxy resin. Preferable amounts are 1–25 parts by weight to 100 parts by weight of the epoxy resin and more preferably 1–10 parts by weight.

Preferably, organic decomposing-type foaming agents are utilized. For example, azodicarbonamide, azobisformamide, azobisisobutyronitrile, barium azodicarboxylate, N,N'-dinitrosopentamethylene tetramine, N,N'-dinitroso-N,N'-dimethylterephthalamide, paratoluenesulfonyl hydrazide, benzenesulfonyl hydrazide, 4,4'-oxybenzenesulfonyl hydrazide and other related compounds may be used. Any one or a combination of two or more of these foaming agents may be used. Azodicarbonamide is particularly preferred.

The foaming agent is preferably added in an amount to provide a foaming ratio of about 2–10 times, and more preferably about 2–6 times. That is, the amount of foaming agent utilized will produce a foam material having a volume 2–10 times larger than the volume of the foam precursor material, and more preferably about 2–6 times larger. While specific amounts will depend upon the particular epoxy resin that is selected, the foaming agent may be added at about 0.5–15 parts by weight to 100 parts by weight of the epoxy resin and more preferably 0.5–10 parts by weight.

A representative method for incorporating the shaped foamable structure 10 into the cavity 6 of the rocker panel 1 and subsequent operations will now be described. Specifically, the fixture base 31 of one of the support members 30 may be first secured to the bottom surface of the outer panel 4 by spot welding or other such methods in such a way that the support wall 32 is substantially perpendicular to the longitudinal direction of the outer panel 4. The inner panel 2 and outer panel 4 may then be welded at flanges 3 and 5 in order to form the rocker panel 1. Subsequently, one of the engagement projections 17 of the shaped foamable material 11 may be inserted into the opening 33 of the support wall 32 of the secured support member 30. Support member 30 may be positioned on the bottom surface of the outer panel 4 in such a way that its support wall 32 faces the support wall 32 that was previously secured to the outer panel 4. At the same time, the second engagement projection of the shaped foamable material 11 may be inserted into the opening 33 of the support wall 32 of this support member 30. Under this condition, the fixture base 31 of the second support member 30 can be secured to the bottom area of the outer panel 4 by spot welding or other such methods. Thus, the shaped foamable structure 10 is attached to the outer panel 4 in a manner that the foamable pieces 12 of the shaped foamable material 11 are preferably arranged in series along the longitudinal direction of the outer panel 4.

Subsequently, the inner rocker panel 2 and the outer rocker panel 4 are welded at flanges 3 and 5 thereof by spot welding to form the rocker panel 1 having the shaped foamable structure 11 disposed in the cavity 6. As a result, the shaped foamable structure 10 is attached in the cavity 6 of the rocker panel 1 in such a way that the shaped foamable material 11 extends along the longitudinal direction of the cavity 6. As shown in FIGS. 2 and 3, the shaped foamable material 11 is preferably retained within the cavity 6 without contacting the inner surfaces of the panels 2 and 4, so as to form a clearance between the periphery of the shaped foamable material 11 and the inner surface of the rocker panel 1.

Thereafter, the entire rocker panel 1 may optionally be introduced into the paint bath. During this dip painting operation, the paint coats the outer surface of the rocker panel 1. The paint also enters the cavity 6 through paint introduction holes (not shown) that may be formed in the rocker panel 1. Thus, the paint also coats the cavity surfaces of the rocker panel 1. As will be easily understood, the paint introduced into the cavity 6 will be effectively applied to the inner surfaces of the rocker panel 1, because the shaped foamable material 11 is retained without contacting the inner surfaces of the rocker panel 1. As a result, the paint may suitably coat the cavity surfaces of the rocker panel 1 without leaving any un-painted portions.

The rocker panel 1 can be heated using any suitable external heating source to both bake the paint coat and heat the shaped foamable material 11 within the cavity 6. As a result, the heated shaped foamable material 11 (i.e., the foamable pieces 12, the connecting pieces 14 and the engagement projections 17) will expand to produce the foamed product 20, as shown in FIGS. 4 and 5. The foamed products 20 thus produced reliably adhere to the entire interior surface of the rocker panel cavity 6. As a result, the foamed product 20 fills or closes the cavity 6, thereby providing excellent damping and sound insulation properties, as well as rigidity, to the rocker panel 1.

It is important to note that when the shaped foamable material 11 is heated by the external heat source, the heat can be effectively conducted to the shaped foamable material 11, due to the clearances 13 provided between the foamable pieces 12. As a result, the shaped foamable material 11 can be quickly and uniformly heated, so as to foam at a desired expansion ratio in a short amount of time. Therefore, such a shaped foamable structure 10 may be specifically useful, if the rocker panel 1 has a large cross-sectional area.

Also, as best shown in FIG. 4, when the shaped foamable material 11 is expanded by heating, the support walls 32 of the support members 30 may effectively prevent the foamed product 20 from inappropriately expanding in the longitudinal direction of the cavity 6, because the shaped foamable material 11 is retained between the support members 30 that are arranged perpendicular to the longitudinal direction of the cavity 6. Therefore, the foamed product 20 desirably fills or closes the cavity 6 of the rocker panel 1 and reliably adheres to the entire cavity surface. This feature may further contribute to increasing damping and sound insulation properties and rigidity of the rocker panel 1.

Figure 7:
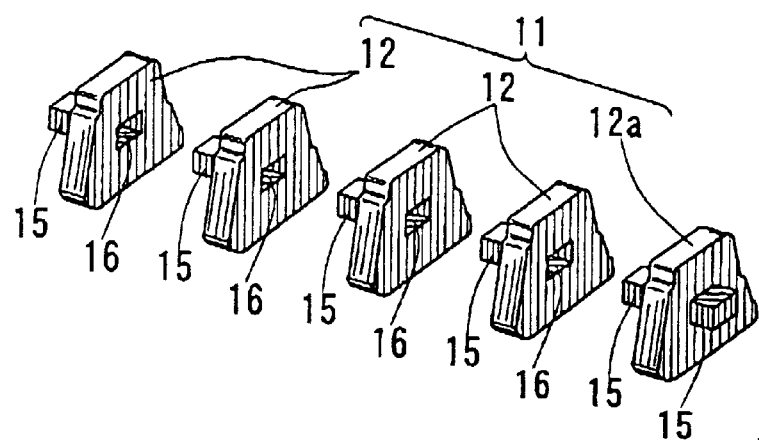
FIG. 7 is a perspective view of a shaped foamable material of a shaped foamable material for a rocker panel according to a second representative embodiment of the present teachings.
Figure 8:
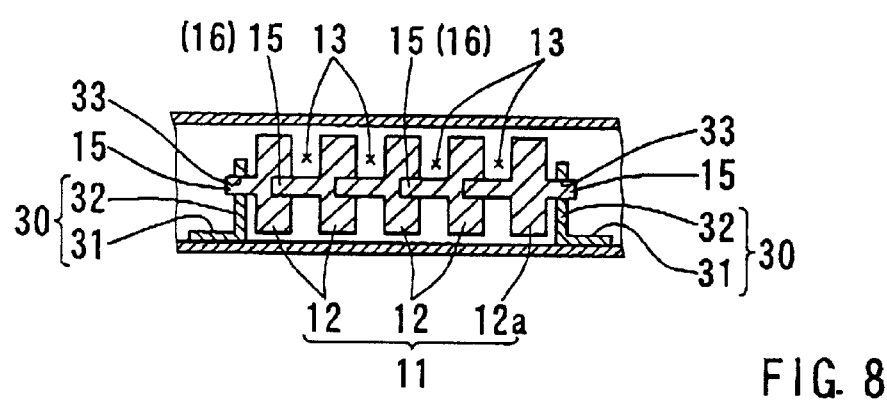
FIG. 8 is a vertical sectional view of the shaped foamable material disposed in a cavity of the rocker panel before the shaped foamable material is expanded.

In this embodiment, each of the foamable pieces 12, the connecting pieces 14 and the engagement projections 17 can be formed by injection molding the foamable material. However, the present invention is naturally not limited to this type of structure. For example, the connecting pieces 14 and the engagement projections 17 can be made of an unfoamable synthetic resin rod or a metal rod (not shown), if desired. As will be appreciated, in such a case, the foamable pieces 12 are formed on the rod preferably by injection molding, so as to produce the shaped foamable material 11 that is externally constructed from the foamable pieces 12, the unfoamable connecting pieces 14, and the unfoamable engagement projections A second representative embodiment, which is closely related to the first representative embodiment, is shown in FIGS. 7 and 8. Therefore, only constructions that are different from those constructions described in the first representative embodiment will be explained with respect to the second representative embodiment.

As shown in FIGS. 7 and 8, the shaped foamable material 11 is substantially constructed from a plurality of foamable pieces 12 and one specially formed foamable piece 12a, which pieces are formed separately from each other. Preferably, each of the foamable pieces 12 has a tenon 15 to serve as a connecting means, which tenon 15 is provided on at least one surface of each foamable piece 12. The tenon 15 preferably has a rectangular cross section and a desired length. Moreover, each foamable piece 12 has a corresponding mortise 16 to serve as the connecting means, which mortise 16 is formed on the opposite surface from the tenon 15. The tenon 15 and mortise 16 are preferably formed to fit tightly together and the depth of the mortise 16 is preferably less than the length of the tenon 15.

On the other hand, unlike the normal piece 12, the special foamable piece 12a has tenons 15 provided on both surfaces. These tenons 15 preferably project in opposite directions and are aligned with each other.

The normal foamable pieces 12 and the special foamable piece 12a may be arranged in series in such a way that the tenons 15 and the mortises 16 are adjacent to each other. Thereafter, the respective tenons 15 are press fitted into the respective mortises 16, thereby producing the shaped foamable material 11 in which the foamable pieces 12 and 12a are arranged in parallel with desired clearances 13.

As will be easily recognized, in the shaped foamable material 11 thus constructed, the tenon 15 of the terminal normal foamable piece 12 and the remaining tenon 15 of the special foamable piece 12a function as engagement projections that engage the opening 33 that is formed in the support wall 32 of each support member 30. Therefore, each tenon 15 is preferably formed to fit tightly inside each opening 33.

Figure 9:
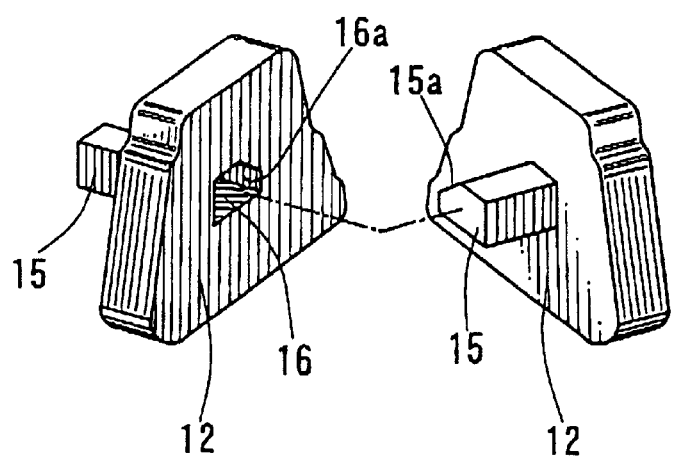
FIG. 9 is a perspective view of a modified form of the shaped foamable material according to the second representative embodiment.

In this embodiment, the tenon 15 has a rectangular cross section and the mortise 16 has a corresponding rectangular shape so as to tightly fit with the tenon 15. However, the shapes of the tenon 15 and the mortice 16 are not limited to such a shape. For example, as shown in FIG. 9, the tenon 15 can be provided with a removed part 15a along the entire length thereof, and the mortice 15 can be provided with a corresponding removed part 16a extending therethrough. In other words, the tenon 15 and the mortise 16 can be designed so as to have a notched rectangular cross section. As will be easily understood, in such a structure, the adjacent foamable pieces 12 and 12a can be necessarily aligned in desired directions. As a result, the foamable pieces 12 and 12a can not be inadvertently coupled in the wrong position. Therefore, the shaped foamable material 11 can be easily and reliably manufactured.

Further, it is important to note that the shapes of the tenon 15 and the mortise 16 are also not limited to the notched rectangular cross section. Instead, the cross-sectional shape of the tenon 15 and the mortise 16 can be, for example, a trapezoidal shape, a triangular shape, a notched circular shape or other such shapes that can provide such a connecting function.

Moreover, in the first and the second representative embodiments, the shaped foamable material 11 is positioned and supported in the cavity 6 of the rocker panel 1 by means of the pair of support members 30. However, the attaching means is not limited to such support members 30.

Further, the rocker panel 1 of a vehicle body has been utilized as a representative hollow structural member. However, the hollow structural member is not limited to the rocker panel and may be a pillar, a roof side panel or other panels of a vehicle body. Moreover, the hollow structural member is not limited to parts of a vehicle body, as the present teachings are equally applicable to the filling and/or reinforcing of any hollow members, such as structural components for buildings and ships.

What is claimed is:

1. An apparatus, comprising:
   a foamable structure having a plurality of connecting pieces and a plurality of fins extending substantially perpendicularly from the connecting pieces, wherein the connecting pieces and the fins comprise a foamable material and the fins are adapted to facilitate uniform heating and expansion of the foamable structure and
   at least one support member attached to the foamable structure, wherein the at least one support member is arranged and constructed to position the foamable structure within a cavity of a hollow structural member so that the foamable structure does not contact an inner surface of the hollow structural member.

2. An apparatus as in claim 1, wherein the connecting pieces and the fins are integrally formed.

3. An apparatus as in claim 1, wherein the foamable structure is arranged and constructed to fill and close the hollow structural member when the foamable material and the hollow structural member are heated.

4. An apparatus as in claim 1, wherein the foamable material comprises a plurality of individually formed foamable pieces and the respective foamable pieces are directly interconnected to form the foamable structure.

5. An apparatus as in claim 4, wherein at least one foamable piece comprises a tenon and at least one foamable piece comprises a mortice coupled with the tenon.

6. An apparatus as in claim 5, wherein the foamable structure is arranged and constructed to fill and close the hollow structural member when the foamable material and the hollow structural member are heated.

7. An apparatus as in claim 1, wherein the foamable structure is an elongated foamable material having a longitudinal axis, spaces are defined between the respective fins and the spaces are extend perpendicularly to the longitudinal axis.

8. An apparatus as in claim 1, further comprising a hollow structure comprising a cavity and an inner surface, wherein the foamable material is disposed within the hollow structure, so that the fins do not contact the inner surface of the hollow structure.

9. An apparatus as in claim 1, wherein the foamable material comprises an epoxy resin having an epoxy equivalents value of about 300–4000, a curing agent and a foaming agent.

10. An apparatus as in claim 9, wherein the foamable material further comprises at least one reinforcing material selected from the group consisting of glass, metal and ceramic.

11. An apparatus as in claim 9, wherein the epoxy resin is a bisphenol type epoxy resin.

12. An apparatus as in claim 9, wherein the curing agent is selected from the group consisting of amine based curing agents, imidazole based curing agents and monethylamine trifluoride complexes.

13. An apparatus as in claim 9, wherein the foaming agent is provided in an amount that provides a foaming ratio of about 2–10.

14. An apparatus as in claim 9, wherein the foaming agent is azodicarbonamide.

15. An apparatus as in claim 1, wherein the foamable material is substantially stable at temperatures below about 50° C.

16. An apparatus as in claim 15, wherein the foamable material comprises a bisphenol type epoxy resin, a curing agent selected from the group consisting of amine based curing agents, imidazole based curing agents and monethylamine trifluoride complexes and a foaming agent, wherein the foaming agent is provided in an amount that provides a foaming ratio of about 2–10.

17. An apparatus as in claim 16, wherein the foamable material further comprises at least one reinforcing material selected from the group consisting of glass, metal and ceramic.

18. An apparatus as in claim 17, wherein the foaming agent is azodicarbonamide.

19. An apparatus, comprising:

a foamable structure comprising a plurality of individually formed foamable pieces, each individually formed foamable piece having a connecting piece and fin extending substantially perpendicularly from the connecting piece, wherein the respective connecting pieces and fins are directly interconnected to form a foamable structure, the connecting pieces and the fins comprise a foamable material and the fins are adapted to facilitate uniform heating and expansion of the foamable structure and at least one support member attached to the foamable structure, wherein the at least one support member is arranged and constructed to position the foamable structure within a cavity of a hollow structural member so that the foamable structure does not contact an inner surface of the hollow structural member.

20. An apparatus as in claim 19, wherein at least one foamable piece comprises a tenon and at least one foamable piece comprises a mortice coupled with the tenon.

21. An apparatus as in claim 20, wherein the foamable material comprises an epoxy resin having an epoxy equivalents value of about 300–4000, a curing agent and a foaming agent.

22. An apparatus as in claim 21, wherein the foamable material further comprises at least one reinforcing material selected from the group consisting of glass, metal and ceramic.

23. An apparatus as in claim 21, wherein the epoxy resin is a bisphenol type epoxy resin.

24. An apparatus as in claim 21, wherein the curing agent is selected from the group consisting of amine based curing agents, imidazole based curing agents and monethylamine trifluoride complexes.

25. An apparatus as in claim 20, wherein the foaming agent is provided in an amount that provides a foaming ratio of about 2–10.

26. An apparatus as in claim 25, wherein the foaming agent is azodicarbonamide.

27. An apparatus as in claim 19, wherein the foamable material is substantially stable at temperatures below about 50° C.

28. An apparatus as in claim 27, wherein the foamable material comprises a bisphenol type epoxy resin, a curing agent selected from the group consisting of amine based curing agents, imidazole based curing agents and monethylamine trifluoride complexes and a foaming agent, wherein the foaming agent is provided in an amount that provides a foaming ratio of about 2–10.

29. An apparatus as in claim 28, wherein the foamable material further comprises at least one reinforcing material selected from the group consisting of glass, metal and ceramic.

30. An apparatus as in claim 28, wherein the foaming agent is azodicarbonamide.

31. An apparatus as in claim 28, wherein the foamable structure is arranged and constructed to fill and close the hollow structural member when the foamable structure and the hollow structural member are heated.

32. An apparatus as in claim 19, wherein the foamable structure is an elongated foamable material having a longitudinal axis, spaces are defined between the respective fins and the spaces extend perpendicularly to the longitudinal axis.

33. An apparatus as in claim 32, wherein the at least one support member comprises a first support member coupled to substantially a first end of the elongated foamable material and a second support member coupled to substantially a second end of the elongated foamable material.

34. An apparatus as in claim 33, further comprising a hollow structure coupled to the first and second support members, wherein the elongated foamable material does not contact the interior surface of the hollow structure, and a layer of paint that covers the entire interior surface of the hollow structure, except for portions of the interior surface that are coupled to the first and second support members.

35. An apparatus as in claim 34, wherein the hollow structure is a rocker panel of a vehicle body.

36. An apparatus as in claim 34, wherein the foamable material comprises an in having an epoxy equivalents value of about 300–4000, a curing agent and a foaming agent.

37. An apparatus as in claim 34, wherein the foamable material is substantially temperatures below about 50° C.

* * * * *